Figure 1:
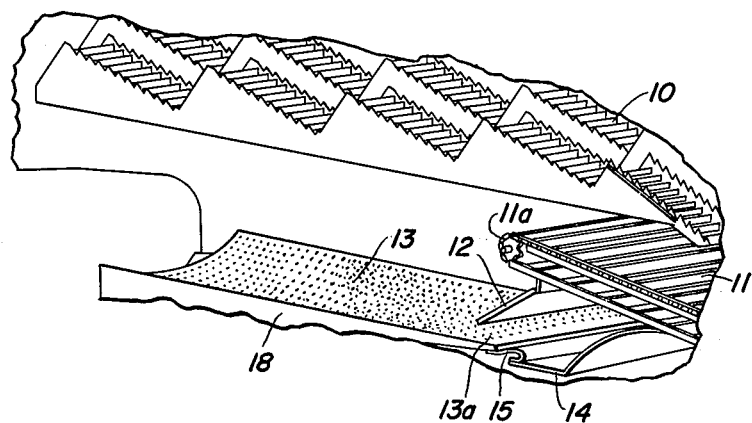

March 27, 1956 B. BUTTARS 2,739,597
AGRICULTURAL COMBINE CHAFFER SCREEN
Filed May 6, 1953 2 Sheets-Sheet 1

Inventor:
BEN BUTTARS.
By
Attorneys.

Inventor:
BEN BUTTARS,
Attorneys.

United States Patent Office 2,739,597
Patented Mar. 27, 1956

2,739,597

AGRICULTURAL COMBINE CHAFFER SCREEN

Ben Buttars, Weston, Idaho

Application May 6, 1953, Serial No. 353,298

8 Claims. (Cl. 130—24)

This invention relates to agricultural machines, and particularly to that type of agricultural machine known as a combine, wherein grain and similar seed crops standing in the field are harvested and threshed, in a combined operation, as the machine travels through the field.

Agricultural combines are in widespread use throughout the world, and, through the years, have been developed to a high degree of perfection, so far as harvesting and threshing of the crop are concerned. Yet, their remains a problem in the use of these machines in certain agricultural areas where the fields are not level, but slope relatively steeply, as, for example, where laid out on a hillside or on other sharply sloping terrain. In such instances, farmers have experienced high losses in crop recovery, due to the piling up of the threshed mixture of chaff and grain at one or the other of the sides of the chaffer screens or sieves by reason of the slope of the machine in its travel transversely of the slope of the field.

Various arrangements have heretofore been proposed for correcting this defect of agricultural combines when operating across sharply sloping terrain, but these have involved either expensive leveling devices for the working parts of the combine with respect to the running gear thereof, or attachments which require structural alterations in the machine itself.

In accordance with this invention, I have provided an agricultural combine wherein a special and unique construction of the chaffer screens insures substantially complete grain recovery, regardless of whether the machine is operating on the level or on sharply sloping terrain. There is no extraneous structure, nor are there working parts additional to those ordinarily provided in a combine.

An outstanding feature of my construction resides in the provision of an elongate chaffer screen of longitudinally concave formation, which tapers from substantially no concavity at its forward or feed end to deep-dished concavity at its rearward or discharge end. This undivided screen or sieve takes the place of the conventional side by side, longitudinal chaffer screens or sieves, separated one from another by longitudinal divider strips.

In normal combine operation in level fields, practically all of the important grain separating action is carried out at the forward end portion of the screens, the greater part of the total length of the screens playing only a minor scavenging role on the chaff progressively traveling thereover to discharge at the rearward end of the screens.

My present invention makes use of this fact by maintaining substantially the normal width and flatness of the screen at its forward end portion, so that grain recovery in level field operation is practically of normal character, even though the progressive travel of the threshed material is characteristically different than with conventional machines. On the other hand, when the machine is operating over a sharply sloping terrain, the increasingly laterally dished rearward portion of the screen becomes effective to accommodate the threshed material which slides toward and builds up in depth at one or the other of the sides of the screen, thereby, in effect, adding to the screen capacity under such circumstances and permitting substantially normal screen operation, despite the abnormal piling of the threshed material relative to the screen surface.

Under conditions of hillside operation, therefore, the chaffer screen construction and arrangement of this invention renders effective, for grain recovery purposes, that major portion of the total length of the screens which, in conventional machines, is normally of little use even for level operation.

The hillside operation referred to herein contemplates travel of the combine around the contour of the hill or slope, transversely of and at substantially right angles to the up and down direction of slope, thereby placing the transverse extension or width of the chaffer screen in line with and at substantially the same inclination as the hill or slope and the longitudinal extension of the screen in line with the horizontal contour of the hill or slope, rather than with the up and down extension thereof.

Further objects and features will become apparent from the following detailed description of the preferred specific construction illustrated by way of example in the accompanying drawings.

Figure 2:
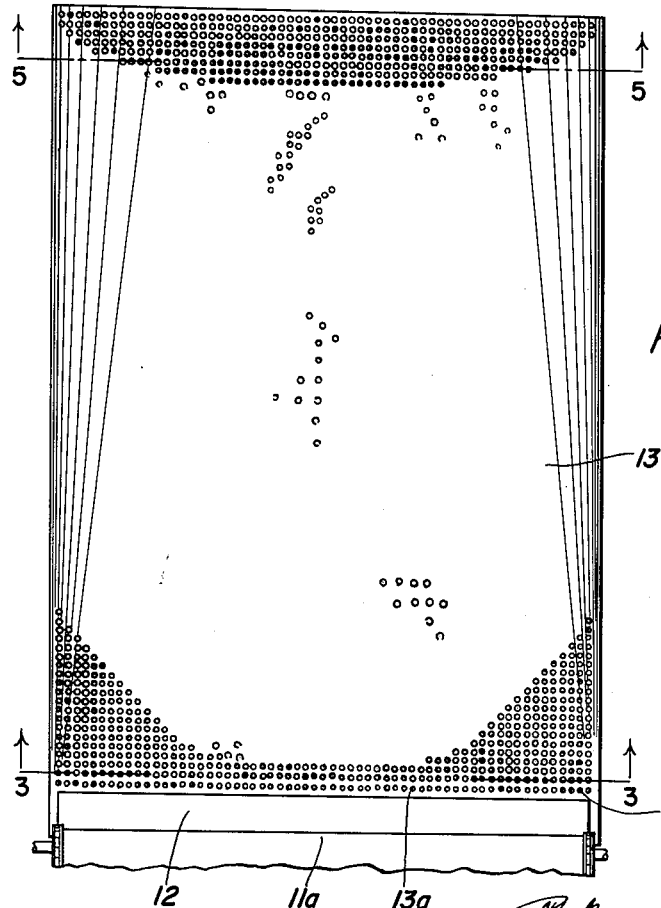

In the drawings:

Fig. 1 represents a fragmentary perspective view of the interior of an agricultural combine, which, except for the chaffer screen, is of conventional construction;

Fig. 2, a plan view of the chaffer screen portion of the machine of Fig. 1, the view being drawn to a somewhat enlarged scale and including fragmentary portions of the structure involved in the feeding of the threshed chaff and grain mixture to the forward end of the screen.

Figure 3:
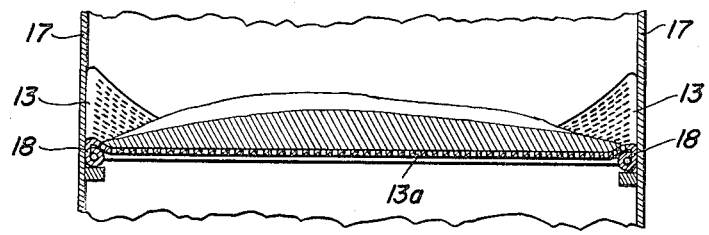
Figure 4:
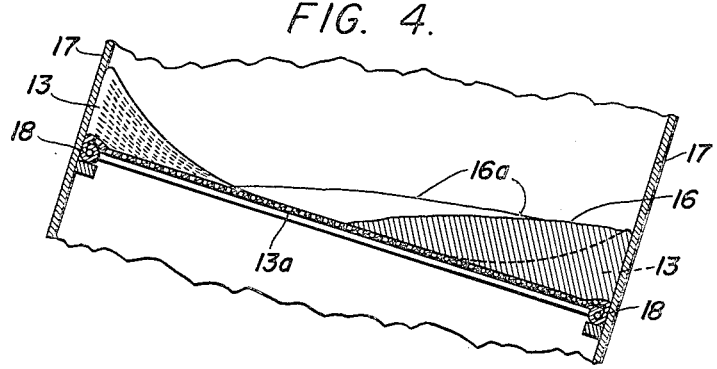

Fig. 3, a fragmentary, transverse, vertical section taken on the line 3—3 of Fig. 2, illustrating the condition of the threshed mixture resting on the forward portion of the chaffer screen during normal operation on the level;

Fig. 4, a corresponding view during operation on sharply sloping terrain; and

Figure 5:
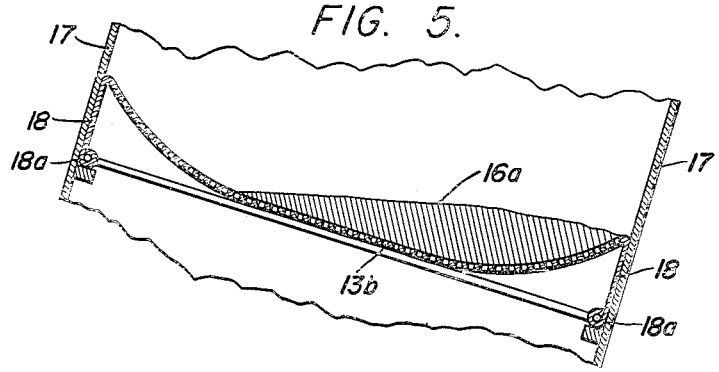

Fig. 5, a similar sectional view taken on the line 5—5 during the hillside operation of Fig. 4.

Referring to the drawings:

The agricultural combine illustrated fragmentarily in the drawings represents one of the several different commercial machines presently available to farmers. Except for the chaffer screen, its construction is conventional. No attempt is made to illustrate in detail parts of the machine not changed by my invention, nor to show all the mechanism making up a modern combine. Such mechanism is well known. Only so much of the conventional mechanism and structure is shown as is necessary to indicate the structural and functional nature of my new combination. In this connection, it should be realized that such conventional mechanism and structures as are illustrated may vary in construction, depending upon the commercial make of agricultural combine to which this invention is applied.

Thus, as illustrated in Fig. 1, conventional straw-walker mechanism is indicated at 10, and one type of conventional feed mechanism for the threshed mixture of grain and chaff is indicated at 11. In the illustrated instance, this feed mechanism 11 is in the nature of an endless belt. A common alternative is a reciprocating, shaker type of conveyor.

In the illustrated construction, the threshed mixture of grain and chaff, discharged from the end 11a of the conveyor belt, drops onto a downwardly sloping feed plate 12, from where it slides onto the forward or feed end of the chaffer screen 13.

In practically all agricultural combines of modern manufacture, there are a plurality of side-by-side disposed, longitudinally elongate, chaffer screens, separated one from another by raised divider strips, and longitudinally reciprocable in order to impart a shaking and rearward conveying action to the received mixture of grain and chaff.

The machine of the invention preferably utilizes, however, a single chaffer screen of laterally intercommunicating formation throughout its length, that is to say undivided either transversely or longitudinally. This chaffer screen is mounted in conventional manner for longitudinal reciprocation, being here shown as flexibly connected to the forwardly positioned stationary structure 14 of the machine by means of a connecting member 15 of flexible sheet material, in conventional fashion. The usual mechanism (not shown) employed in conventional machines for reciprocating the chaffer screens is similarly employed in the machine of the invention to reciprocate the chaffer screen 13. Such mechanism and its tie in with the chaffer screens are well known, and need not be here shown nor described.

The single chaffer screen 13 comprehends in its dimensions the over-all width and length of the conventional plurality of chaffer screens, and accommodates, at its forward end 13a, the grain and chaff mixture deposited thereon from feed plate 12.

The principal purpose of my unique combination of specially contoured chaffer screen and combine proper, is, as mentioned hereinbefore, to enable the combine to travel along a hillside during the grain harvesting and threshing operation, without the great loss of grain which accompanies hillside operation of the ordinary combine.

In the accomplishment of this purpose, the contour of the chaffer screen is such as to effectively increase the screening area available to the grain and chaff mixture which abnormally collects at the low side of the screen when the combine slopes sidewardly in traveling along a hillside. As can be seen at 16, Fig. 4, such collecting and piling of the grain and chaff mixture along the low side of the machine reduces considerably the screening area which is normally effective. Not only is the mixture piled high and deep at the low side, but it partially overlies and rests upon the adjacent sidewall, 17, of the machine. Thus, with normal chaffer screens, a large quantity of the grain and chaff mixture is never exposed to a screening surface. With the machine of the invention, however, this situation is remedied by the increased screening surface made available to this abnormally collected grain and chaff mixture as it travels along the length of the chaffer screen to discharge at the rearward end thereof.

In order to provide this effective increase in screening area in a simple and inexpensive manner when the machine is traveling along a hillside, the chaffer screen 13 is constructed so that its screening surface is laterally dished to a convergently increasing extent longitudinally of the screen from little or no concavity at its forward or feed end 13a, to a maximum, or deep-dished, concavity at its rearward or discharge end 13b.

The chaffer screen may be of any of the accepted types, in structural respects other than the special contour indicated. As illustrated, the chaffer screen 13 is a perforated metal plate, which is formed to the desired contour in any suitable manner, for example, by the use of a suitably contoured stamping die. For mounting purposes in the combine proper, it is provided with opposite, depending sidewalls 18, the entire screen structure being strengthened by a rolled margin 18a. Regardless, however, of whether the screen is formed as a perforated metal plate or in accordance with any of the other screen constructions in common use, it comprises structure making up an elongate foraminous sheet formation having a feed end which is approximately straight in cross-section, a discharge end which is concave in cross-section, and an intermediate portion which merges the feed end into the discharge end.

The mesh of the chaffer screen or sieve and the particular degree of concavity and of the convergency of such concavity will depend largely upon the particular crop to be handled by the combine and upon the character of the terrain encountered in a particular area. The illustrated screen or sieve 13 is designed for handling wheat ordinarily produced by dry farming areas of the Western part of the United States.

In operation, the mixed grain and chaff conveyed by the conveyor 11 from the threshing mechanism (not shown) of the combine to a discharge on the feed plate 12, is deposited upon the forward or feed end 13a of the chaffer screen 13 in a continuously flowing stream.

With the combine operating normally in level fields, the feed will be substantially uniform over the entire width of the screen, and the entire breadth of the forward portion of the screen will provide an effective screening area which is of approximately normal extent. It will be noted from Fig. 2 that the degree of convergency of the concavity of the screen is gradual, and produces little reduction in effective screening area within the forward one-half of the length of the screen. It is within the forward portion of the ordinary chaffer screens of conventional combines that most of the grain is separated from the chaff, the rearward portion serving principally a scavenging role. Thus, the contoured screen of the present invention does not interfere with grain recovery during normal operation on the level. The role of scavenger is satisfactorily performed by the substantially flat central portion of the rearward length of the screen.

In abnormal, hillside operation of the same combine, however, the specially contoured chaffer screen or sieve of the invention serves a purpose productive of unusual and highly worthwhile results.

Under these circumstances, where the entire machine is tilted sideways in its harvesting and threshing travel and the grain and chaff mixture slides toward and piles deeply at and along the low side of the machine, the discharge from the conveyor 11 and from the feed plate 12 onto the chaffer screen has considerable depth at the low side of the machine, there being little, if any, left at the opposite high side of the machine, see 16, Fig. 4.

Under these circumstances, the screening action is largely ineffective throughout the forward portion of travel of the mixture along the screen 13, but, as the longitudinal travel of such mixture continues, the increasingly dished contour of the screen makes more and more of the screen surface available for screening purposes, until, during approximately the rearward one-third of the length of travel, the screening action is substantially equivalent to the normal, see 16a, Fig. 4.

Thus, with the use of the combine of the invention, approximately the forward one-half portion of the chaffer screen is always effective for work on the level, while approximately the rearward one-half and particularly the rearward one-third is effective during such times as the combine is traveling along a hillside.

Accordingly, my improved combine can be used, without additional equipment or structural alterations, for both work on the level and work on hillsides or other sharply sloping terrain.

As will be noted from the drawings, it is preferred that the concavity of the chaffer screen be confined to the marginal portions thereof, the longitudinal central portion thereof being flat. Also, while it is presently preferred that the screen be of single, unitary formation, it may be made in sections wherever found desirable.

Whereas this invention is here illustrated and described with respect to a particular preferred embodiment thereof, it should be understood that various changes, apart from the mere substitution of equivalents, may be made therein and various other constructions may be adopted on the basis of the teachings hereof, by those skilled in the art, without departing from the protective scope of those of the following claims which are generic to the broader inventive concepts disclosed.

I claim:

1. A chaffer screen for use in an agricultural combine equipped with a grain and chaff delivering conveyer, said screen comprising structure making up an elongate foraminous sheet having a feed end, an intermediate portion, and a discharge end, said feed end being approximately straight in cross-section, said discharge end being concave in cross-section, and said intermediate portion merging said straight cross-section of the feed end into said concave cross-section of the discharge end.

2. The chaffer screen of claim 1, wherein approximately the one-third of the foraminous structure that is adjacent to the discharge end thereof is deep-dished relative to the portion adjacent to the feed end thereof.

3. The chaffer screen of claim 2, wherein the longitudinal central portion of the foraminous structure is approximately flat.

4. The chaffer screen of claim 3, wherein the screen is of laterally intercommunicating formation throughout its length.

5. In a unitary agricultural combine machine adapted for travel through a crop area to effect combined harvesting and threshing of seed crops standing in said area, the combination of a grain and chaff delivering conveyer, and a chaffer screen, said chaffer screen comprising structure making up an elongate foraminous sheet having a feed end, an intermediate portion, and a discharge end, said feed end being approximately straight in cross-section, said discharge end being concave in cross-section, and said intermediate portion merging said straight cross-section of the feed end into said concave cross-section; and said chaffer screen having its feed end disposed in grain and chaff receiving adjacency to said conveyer.

6. The combination of claim 5, wherein the chaffer screen has approximately the one-third of its foraminous structure that is adjacent to the discharge end thereof deep-dished relative to the portion adjacent to the feed end thereof.

7. The combination of claim 6, wherein the longitudinal central portion of the foraminous structure is approximately flat.

8. The combination of claim 7, wherein the chaffer screen is of laterally intercommunicating formation throughout its length.

References Cited in the file of this patent

UNITED STATES PATENTS

| | | |
|---|---|---|
| 2,036,239 | Suwalkowski | Apr. 7, 1936 |
| 2,617,425 | Dion | Nov. 11, 1952 |

FOREIGN PATENTS

| | | |
|---|---|---|
| 906,535 | France | May 22, 1945 |